US010411314B2

(12) United States Patent
Liptak et al.

(10) Patent No.: US 10,411,314 B2
(45) Date of Patent: Sep. 10, 2019

(54) BATTERY THERMAL MANAGEMENT ASSEMBLY AND METHOD

(71) Applicant: Ford Global Technologies, LLC, Dearborn, MI (US)

(72) Inventors: Stephen Liptak, Livonia, MI (US); Hyung Min Baek, Fremont, CA (US); Olivia Lomax, Southfield, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 15/340,941

(22) Filed: Nov. 1, 2016

(65) Prior Publication Data

US 2018/0123197 A1    May 3, 2018

(51) Int. Cl.
| | |
|---|---|
| *H01M 10/6556* | (2014.01) |
| *H01M 10/613* | (2014.01) |
| *H01M 10/615* | (2014.01) |
| *H01M 10/625* | (2014.01) |
| *H01M 10/653* | (2014.01) |
| *H01M 10/6567* | (2014.01) |

(Continued)

(52) U.S. Cl.
CPC ......... *H01M 10/6556* (2015.04); *B60L 50/15* (2019.02); *B60L 50/16* (2019.02); *B60L 50/64* (2019.02); *B60L 50/66* (2019.02); *B60L 58/26* (2019.02); *B60L 58/27* (2019.02); *H01M 10/04* (2013.01); *H01M 10/613* (2015.04); *H01M 10/615* (2015.04); *H01M 10/625* (2015.04); *H01M 10/653* (2015.04); *H01M 10/6554* (2015.04); *H01M 10/6567* (2015.04); *B60L 2240/36* (2013.01); *B60L 2240/545* (2013.01); *H01M 2220/20* (2013.01)

(58) Field of Classification Search
CPC ........... H01M 10/6556; H01M 10/613; H01M 10/615; H01M 10/625; H01M 10/653; H01M 10/6554; H01M 10/6567; H01M 10/04; H01M 2220/20
See application file for complete search history.

(56) References Cited

U.S. PATENT DOCUMENTS 8,861,202 B2   10/2014  Nassoiy
9,313,932 B2    4/2016  Choo et al.
(Continued)

FOREIGN PATENT DOCUMENTS

| WO | 2012143120 | 10/2012 |
|---|---|---|
| WO | 2013077205 | 5/2013 |
| WO | 2014114511 | 7/2014 |

*Primary Examiner* — Jane J Rhee
(74) *Attorney, Agent, or Firm* — Carlson, Gaskey & Olds, P.C.

(57) ABSTRACT

An exemplary battery thermal management assembly includes a first structure having a first material composition, and a second structure having a different, second material composition. The second structure is configured to exchange thermal energy between a battery array and a fluid communicated through a fluid channel that is bounded by the first and second structures. An exemplary battery thermal management method includes securing a first structure of a first material composition relative to a second structure of a different, second material composition to provide a fluid channel. The method further includes using the second structure to pass thermal energy between a battery and a fluid within the fluid channel.

17 Claims, 5 Drawing Sheets

(51) Int. Cl.
    *H01M 10/04*     (2006.01)
    *H01M 10/6554*     (2014.01)
    *B60L 50/15*     (2019.01)
    *B60L 50/16*     (2019.01)
    *B60L 58/26*     (2019.01)
    *B60L 58/27*     (2019.01)
    *B60L 50/60*     (2019.01)
    *B60L 50/64*     (2019.01)

(56) References Cited

U.S. PATENT DOCUMENTS

2007/0177356 A1     8/2007   Panek
2015/0093613 A1     4/2015   Obasih et al.

BATTERY THERMAL MANAGEMENT ASSEMBLY AND METHOD

TECHNICAL FIELD

This disclosure is directed toward a thermal management assembly for a traction battery. The thermal management assembly uses a fluid to manage thermal energy within the traction battery.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack is a relatively high-voltage traction battery that selectively powers the electric machines and other electrical loads of the electrified vehicle. The battery pack includes a plurality of interconnected battery cells that store energy for powering these electrical loads. The battery pack can require cooling or heating. Some battery packs manage thermal energy using a fluid.

SUMMARY

A battery thermal management assembly according to an exemplary aspect of the present disclosure includes, among other things, a first structure having a first material composition, and a second structure having a different, second material composition. The second structure is configured to exchange thermal energy between a battery array and a fluid communicated through a fluid channel that is bounded by the first and second structures.

In a further non-limiting embodiment of the foregoing assembly, the first structure is a portion of a battery enclosure, and the first material composition includes a polymer.

In a further non-limiting embodiment of any of the foregoing assemblies, the portion is a tray of the battery enclosure.

In a further non-limiting embodiment of any of the foregoing assemblies, the tray includes a ledge to support the second structure, and an interface between the ledge and the structure is sealed.

In a further non-limiting embodiment of any of the foregoing assemblies, the second structure is a thermal exchange plate and the second material composition includes a metal or metal alloy.

A further non-limiting embodiment of any of the foregoing assemblies includes a third structure that includes a polymer and is overmolded on the portion of the battery enclosure and the thermal exchange plate to secure the thermal exchange plate relative to the portion of the battery enclosure.

In a further non-limiting embodiment of any of the foregoing assemblies, the third structure is a wall of the battery enclosure.

In a further non-limiting embodiment of any of the foregoing assemblies, the assembly includes a third structure overmolded on the first structure to hold the second structure relative to the first structure.

In a further non-limiting embodiment of any of the foregoing assemblies, the third structure includes an extension that extends through an aperture in the second structure and is secured to the first structure.

In a further non-limiting embodiment of any of the foregoing assemblies, the second structure is a thermal exchange plate and the second material composition includes a metal or metal alloy.

In a further non-limiting embodiment of any of the foregoing assemblies, the battery array is disposed directly on the thermal exchange plate.

In a further non-limiting embodiment of any of the foregoing assemblies, the fluid channel has a perimeter. The first structure provides a first section of the perimeter. The second structure provides a remaining, second section of the perimeter.

In a further non-limiting embodiment of any of the foregoing assemblies, the fluid is a liquid coolant that directly contacts the first structure and the second structure when moved through the fluid channel.

A battery thermal management method according to another exemplary aspect of the present disclosure includes, among other things, securing a first structure of a first material composition relative to a second structure of a different, second material composition to provide a fluid channel. The method further includes using the second structure to pass thermal energy between a battery and a fluid within the fluid channel.

A further non-limiting embodiment of the foregoing method includes securing and sealing the second structure to the first structure using a third structure overmolded onto the first and second structures.

In a further non-limiting embodiment of any of the foregoing methods, the first structure is a portion of a battery pack enclosure, and the third structure is another portion of the battery pack enclosure.

In a further non-limiting embodiment of any of the foregoing methods, the first and third structures are polymer-based.

In a further non-limiting embodiment of any of the foregoing methods, the second structure is a thermal exchange plate, and the second material composition includes a metal or metal alloy.

A further non-limiting embodiment of any of the foregoing methods includes overmolding a third structure onto the thermal exchange plate to secure the thermal exchange plate to the second structure. A portion of the third structure extends through an aperture in the thermal exchange plate to contact the first structure.

A further non-limiting embodiment of any of the foregoing methods includes supporting a battery array on a side of the second structure opposite the fluid channel.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a thermal management assembly utilized to manage thermal energy within a battery pack. The thermal management assembly provides one or more fluid channels using first and second structures that have different material compositions. Fluid is moved through the fluid channels to manage thermal energy within the battery pack.

Utilizing the dissimilar materials to provide the fluid channels can simplify assembly and reduce complexity. The first and second structures can be secured together by a third structure that is overmolded.

Figure 1:
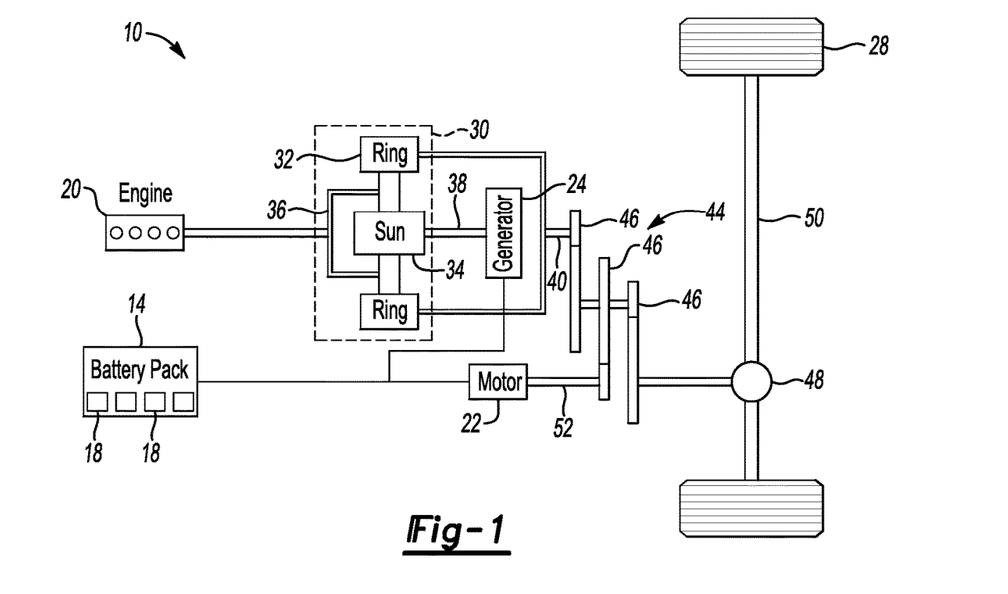
FIG. 1 schematically illustrates an example powertrain for an electric vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
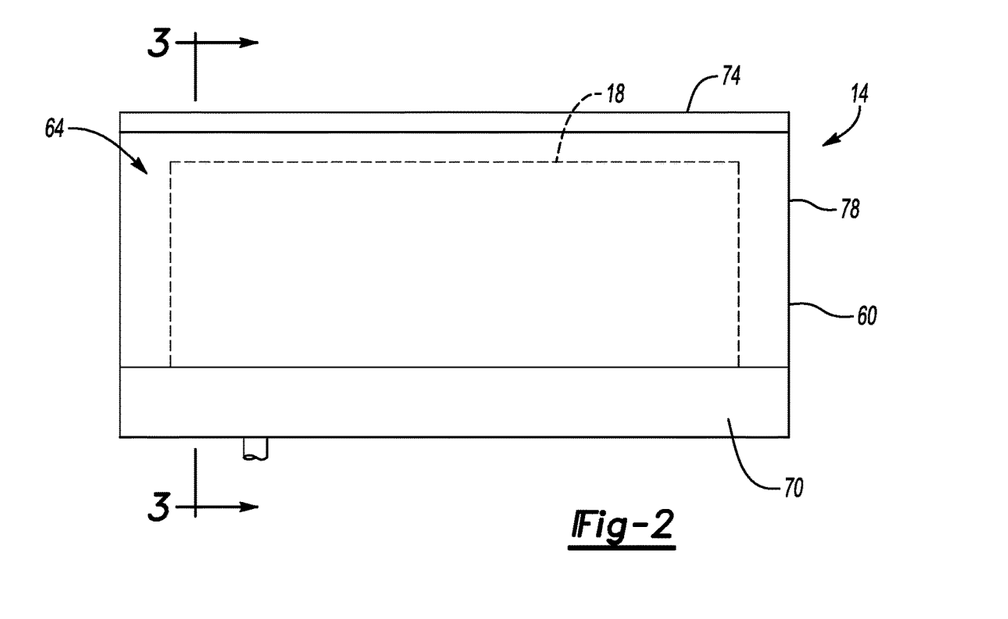
FIG. 2 illustrates a side view of the battery pack from the powertrain of FIG. 1.
Figure 3:
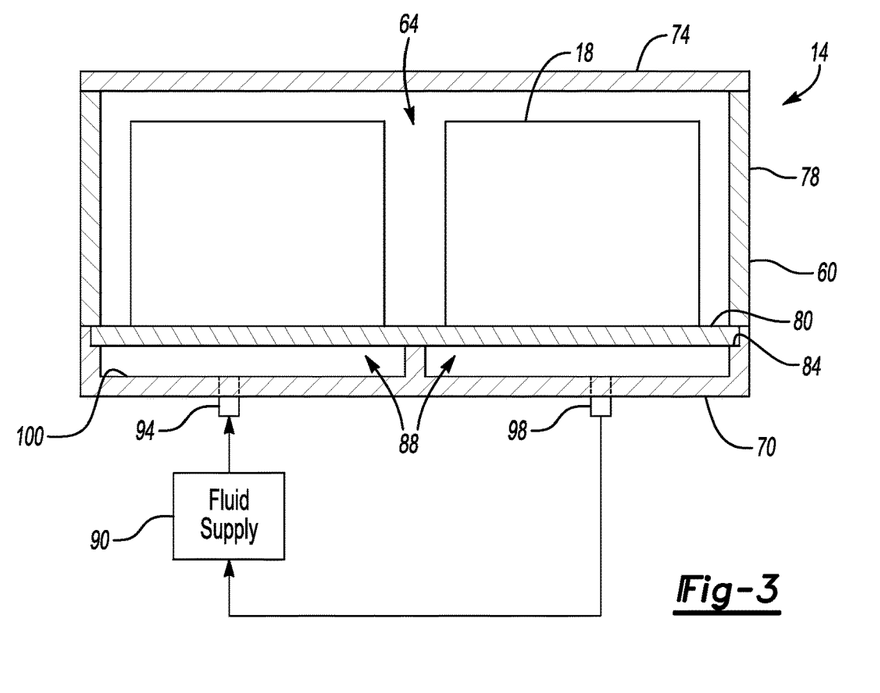
FIG. 3 illustrates a section view at Line 3-3 in FIG. 2.

Referring now to FIGS. 2-3 with continuing reference to FIG. 1, the battery pack 14 includes an enclosure 60 providing an open area 64 housing the battery arrays 18. Two battery arrays 18 are housed within the example enclosure 60. In other examples, the enclosure 60 houses more than two or less than two battery arrays 18.

The enclosure 60 includes a tray 70, a lid 74, and a plurality of walls 78 extending from the tray 70 to the lid 74. The tray 70, the lid 74, and the walls 78 are polymer-based, such as a thermoplastic or thermoset material. The material could be reinforced with an additive, such as glass or carbon fibers. Other exemplary additives could include coconut husks, hemp, shredded dollars, etc. If the material is a thermoset, the material could be rubber.

In this example, the tray 70, the lid 74, and the walls 78 are made of a high-density polyethylene material. The specific material compositions of the tray 70, the lid 74, and the walls 78 could be similar or dissimilar.

Within the open area 64 of the enclosure 60, the arrays 18 are supported upon a thermal exchange plate 80. The thermal exchange plate 80 is a metal or metal alloy in this example. The thermal exchange plate 80, in other examples, could be a material other than metals or metal alloys that is selected to promote thermal conduction, such as a material with a polymer additive like graphene. The material composition of the thermal exchange plate 80 differs from the material composition of the tray 70.

Within the battery pack 14, the thermal exchange plate 80 is situated upon a ledge 84 of the tray 70. The tray 70 is formed such that, when the thermal exchange plate 80 is placed on the ledge 84 of the tray 70, an open area 88 is provided within the battery pack 14.

The open area 88 is used as a fluid channel. Fluid, such as a liquid coolant, can move from a fluid supply 90 through an inlet 94 to the open area 88. Fluid exits the open area 88 through an outlet 98 and can be recirculated back to the fluid supply after passing through, for example, a heat exchanger.

The open area 88 includes sections generally aligned parallel or perpendicular to the battery arrays 18. Thermal energy can move from the arrays 18, through the thermal exchange plate 80, to the fluid within the open area 88.

When thermal energy moves from the arrays 18 to the fluid, the fluid is being used to cool the arrays 18. Taking on the thermal energy from the battery arrays 18 with the fluid reduces a temperature of the battery arrays 18.

Alternatively, if heating the battery arrays 18 is required, thermal energy can be moved from the fluid within the open area 88, through the thermal exchange plate 80, to the battery arrays 18.

The open area 88 has a perimeter 100. A portion of the perimeter is provided by the tray 70, and a remaining portion of the perimeter 100 is provided by the thermal exchange plate 80. Thus, the perimeter 100 is provided by a first structure, here the tray 70, having a first material composition, and further provided by a second structure, here the thermal exchange plate 80, having a second material composition. The tray 70 and the thermal exchange plate 80 together provide a thermal management assembly.

Figure 4:
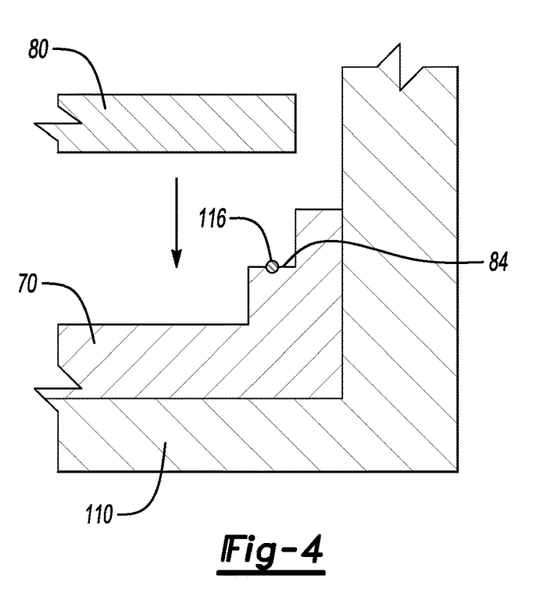
FIG. 4 illustrates a section view of selected portions of a first and a second structure of the battery pack of FIG. 2 within a mold.
Figure 5:
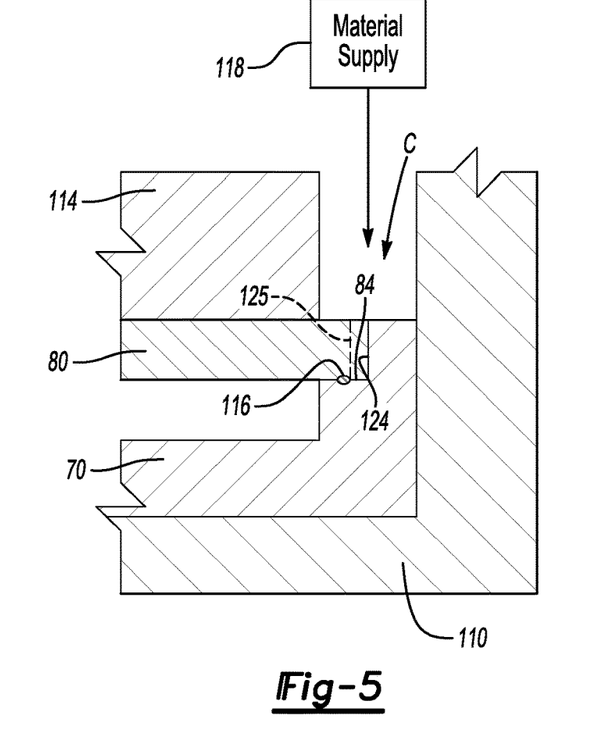
FIG. 5 illustrates the first and the second structure of FIG. 4 within the mold at a stage prior to overmolding a third structure of the battery pack.
Figure 6:
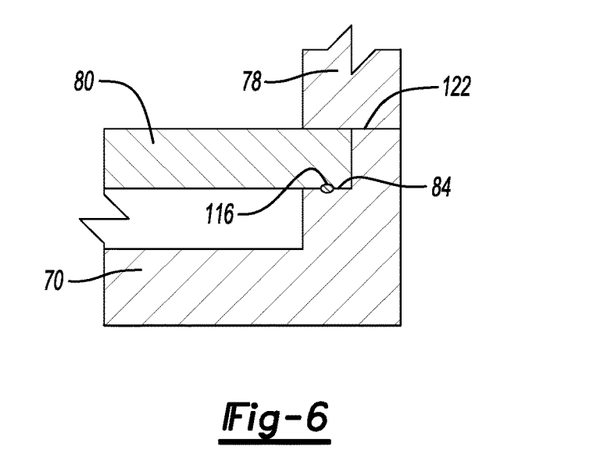
FIG. 6 illustrates the first and the second structure of FIG. 5 after overmolding the third structure.

Referring now to FIGS. 4-6 with continuing reference to FIGS. 2 and 3, the thermal exchange plate 80 can be secured relative to the tray 70 using a third structure, here one or more of the walls 78. The wall 78 is overmolded onto the tray 70 and the thermal exchange plate 80 to hold the thermal exchange plate 80 on the ledge 84 in an installed position.

During the overmolding, the tray 70 is positioned within a die 110, and the thermal exchange plate 80 supported on the ledge 84 as shown in FIGS. 4 and 5. Another die 114 is then moved against the thermal exchange plate 80

The interface between the thermal exchange plate 80 and the ledge 84 can include a seal 116, here an O-ring seal. The seal 116 is used to restrict movement of fluid from the open areas 88. Although shown as an O-ring seal, the seal 116 could, in another example, be an adhesive or some other type of sealing mechanism.

The dies 110 and 114 provide a cavity C that generally corresponds to the shape of the wall 78. The cavity C is filled with a molten polymer material (or an uncured thermoset material) provided by a material supply 118. The molten polymer material cures or solidifies within the cavity C to provide the wall 78. As the material within the cavity C cures or solidifies, the material adheres to at least a portion 122 of the tray 70 opening to the cavity C. After cooling, the wall 78 secures the thermal exchange plate 80 to the tray 70. The thermal exchange plate 80 is then held between the ledge 84 and the wall 78.

In another non-limiting embodiment, the thermal exchange plate 80 could rest on the ledge 84, but be spaced laterally inward from a surface 124 of the tray 70. The thermal exchange plate 80 could terminate at line 125, for example. The wall 78 is then formed to extend into the resulting gap between the line 125 and the surface 124, which provides more contact surfaces between the wall 78, the thermal exchange plate 80, and the tray 70. Increasing the areas of contact can facilitate a stronger mechanical connection and a longer interface joint to resist leakage of any fluid out of the open areas 88.

Bumps or nubs selectively could extend inward from the surface 124 of the ledge 84 can be molded into the tray 70 to aid in positioning the thermal exchange plate 80 spaced from the surface 124 to provide a desired gap between the thermal exchange plate and the surface 124.

Figure 7:
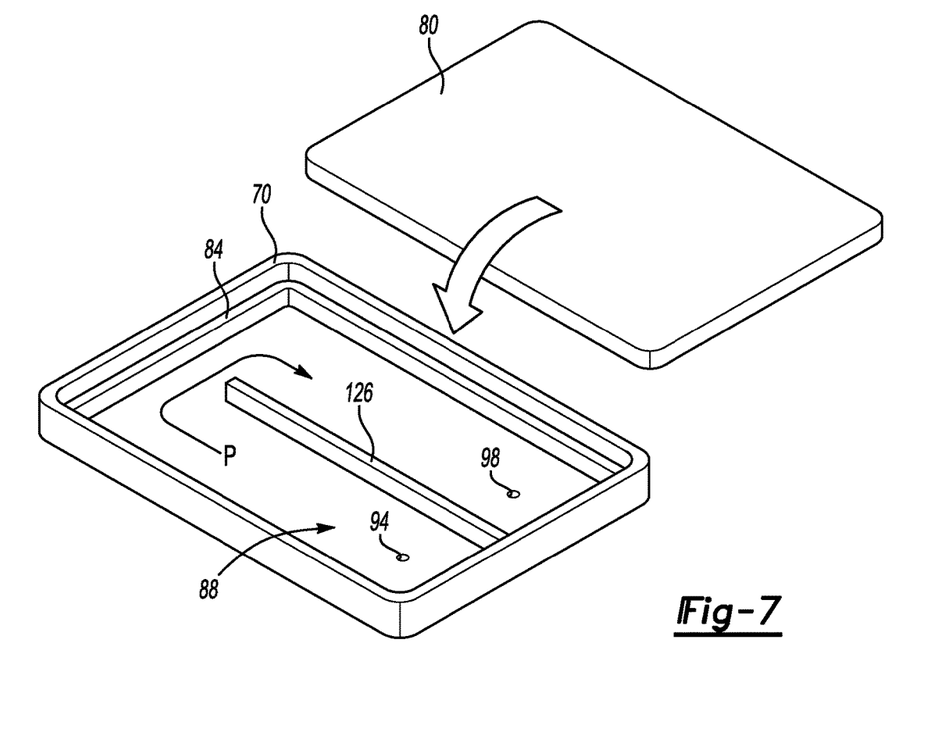
FIG. 7 illustrates a thermal management assembly for the battery pack of FIG. 2 at an early assembly stage.
Figure 8:
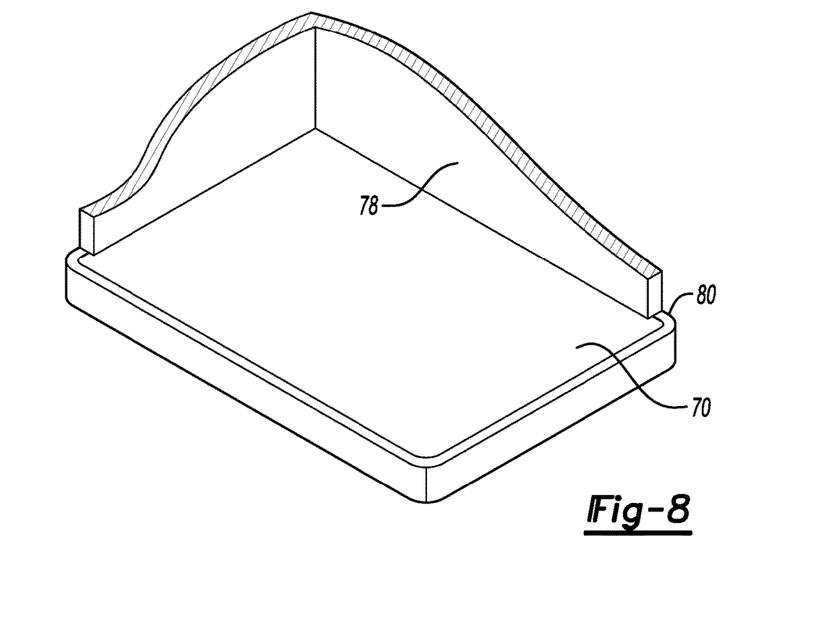
FIG. 8 illustrates a thermal management assembly of FIG. 7 at a later assembly stage than FIG. 7.

Referring now to FIG. 7, the thermal exchange plate 80 is at an early assembly stage prior to being positioned on the ledge 84. The open area 88 is partially divided by a rib 126 of the tray 70. FIG. 8 illustrates a portion of the wall 78 overmolded onto the tray 70 at a later assembly stage. When the thermal exchange plate 80 is assembled to the tray 70, fluid moved through the open area 88 will generally follow a path P from the inlet 94 to the outlet 98. The inlet 94 and the outlet 98 may have different locations such as extending horizontally through the perimeter wall of tray 70 or through the thermal exchange plate 80.

Figure 9:
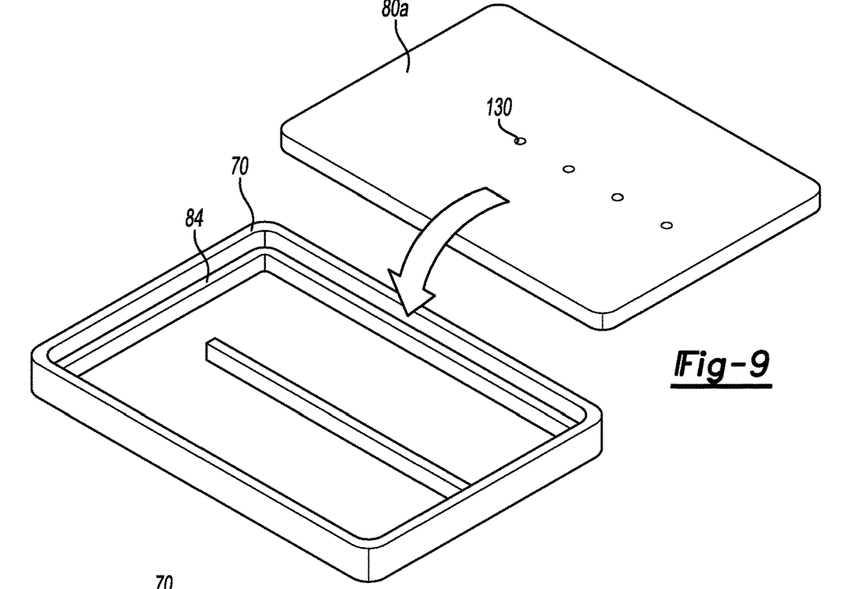
FIG. 9 illustrates a thermal management assembly for the battery pack of FIG. 2 according to another exemplary embodiment of the present disclosure and at an early assembly stage.
Figure 10:
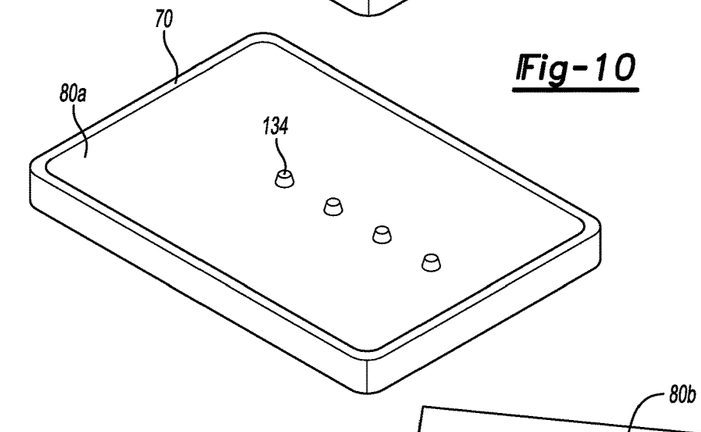
FIG. 10 illustrates the thermal management assembly of FIG. 9 at a later assembly stage than FIG. 9.

Referring now to FIGS. 9 and 10, another exemplary embodiment of this disclosure can include using a third structure, other than the walls 78, to hold a thermal exchange plate 80a relative to the tray 70. In this exemplary embodiment, the thermal exchange plate 80a includes a plurality of apertures 130. After positioning the thermal exchange plate 80a on the ledge 84, an extension 134 is overmolded onto the thermal exchange plate 80a and the tray 70. The extension 134 extends through the apertures 130. The extension 134 includes a head having a diameter greater than a diameter of the apertures 130 to prevent the thermal exchange plate 80a from moving away from the tray 70. If the apertures 130 have a larger opening at the top of the thermal exchange plate 80a relative to the size of the aperture 130 at the bottom (such as a conic, counter board, or countersunk type pocket), then the extension 134 may be included to retain the thermal exchange plate 80a while remaining flush with the top surface of the thermal exchange plate 80a.

The extensions 134 provide an overmolded structure securing the thermal exchange plate 80a to the tray 70. Walls and a top can then be positioned on the tray 70 to complete an enclosure. This exemplary embodiment may not require overmolded walls to secure the thermal exchange plate 80a relative to the tray 70.

Figure 11:
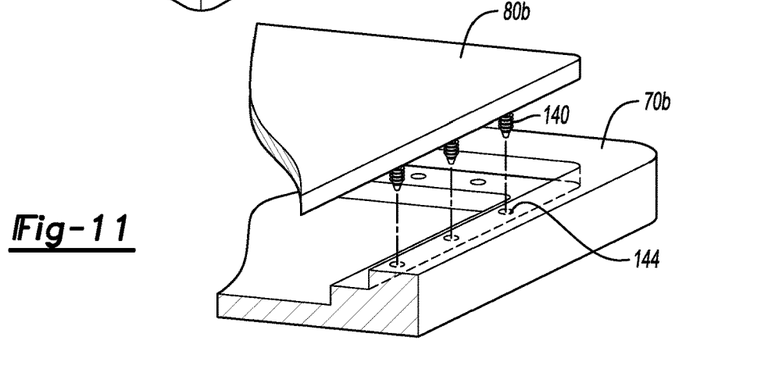
FIG. 11 illustrates a thermal management assembly for the battery pack of FIG. 2 according to another exemplary embodiment of the present disclosure and at an early assembly stage.

Referring now to FIG. 11, yet another exemplary embodiment of the present disclosure can include a thermal exchange plate 80b having a plurality of retention features 140. In this example, the retention features 140 are Christmas tree fasteners (or other such collapsing and then expanding retention features) configured to be received within corresponding apertures 144 provided within a tray 70b. The thermal exchange plate 80b could be secured relative to the tray 70b using exclusively the retention features 140, or could be secured relative to the tray 70b using both the retention features 140 and another structure overmolded onto the tray 70b. Conversely, the retention features 140 may be molded into the tray 70b extending towards the thermal exchange plate 80b, along the ledge 84 and along the rib 126. These features could also subsequently to overmolded by the wall 78 and the extensions 134 to lock the retention features 140 in place and provide a liquid seal between the open area 88 and the other portions of the system.

Features of the disclosed examples include a battery pack having one or more fluid channels provided between a first structure of a first material composition and a second structure of a second material composition.

The disclosed examples provide a thermal management with essentially two different components having dissimilar material compositions. The exemplary embodiments can reduce an overall height of the battery pack and an overall weight because the fluid channels are not contained entirely with a metallic plate. Instead, a portion of the channel can be provided in a tray.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery thermal management assembly, comprising:
    a first structure having a first material composition, wherein the first structure is a portion of a battery enclosure and the first material composition includes a polymer;
    a second structure having a different, second material composition and configured to exchange thermal energy between a battery array and a fluid communicated through a fluid channel bounded by the first and second structures, wherein the second structure is a thermal exchange plate and the second material composition comprises a metal or metal alloy; and
    a third structure that includes a polymer and is overmolded on the portion of the battery enclosure and the thermal exchange plate to secure the thermal exchange plate relative to the portion of the battery enclosure,
    wherein the third structure is formed separately from the first and second structures.

2. The battery thermal management assembly of claim 1, wherein the portion is a tray of the battery enclosure.

3. The battery thermal management assembly of claim 2, wherein the tray includes a ledge configured to support the second structure when the third structure is overmolded on the portion of the battery enclosure and the thermal exchange plate, wherein an interface between the ledge and the structure is sealed.

4. A battery thermal management assembly, comprising:
    a first structure having a first material composition;
    a second structure having a different, second material composition and configured to exchange thermal energy between a battery array and a fluid communicated through a fluid channel bounded by the first and second structures; and
    a third structure overmolded on the first structure to hold the second structure relative to the first structure, the third structure formed separately from the first and second structures.

5. The battery thermal management assembly of claim 4, wherein the third structure comprises an extension that extends through an aperture in the second structure and is secured to the first structure.

6. The battery thermal management assembly of claim 1, wherein fluid channel has a perimeter, the first structure providing a first section of the perimeter, the second structure providing a remaining, second section of the perimeter.

7. The battery thermal management assembly of claim 1, wherein the fluid is a liquid coolant that directly contacts the first structure and the second structure when moved through the fluid channel.

8. A battery thermal management method, comprising:
    forming a first structure;
    after the forming, securing the first structure of a first material composition relative to a second structure of a different, second material composition to provide a fluid channel, the securing including overmolding a molten material onto the first and second structures, the molten material curing to provide a third structure that secures the second structure to the first structure; and
    using the second structure to pass thermal energy between a battery and a fluid within the fluid channel.

9. The battery thermal management method of claim 8, wherein the second structure is a thermal exchange plate, and the second material composition comprises a metal or metal alloy.

10. The battery thermal management assembly of claim 1, wherein the third structure has a third material composition that is dissimilar from the first material composition.

11. The battery thermal management assembly of claim 1, wherein the first structure is configured to support the second structure as the third structure is overmolded on the first structure.

12. The battery thermal management assembly of claim 1, further comprising retention features received within apertures to further secure the first structure relative to the second structure.

13. The battery thermal management assembly of claim 1, wherein the first structure is configured to support the second structure as the third structure is overmolded on the first structure.

14. The battery thermal management method of claim 8, wherein the third structure seals an interface between the first structure and the second structure.

15. The battery thermal management method of claim 8, wherein the first structure, the second structure, and the third structure are formed separately from each other and are each a separate and distinct structure.

16. The battery thermal management method of claim 8, further comprising, after the forming, supporting the second structure with the first structure, and then overmolding to provide the third structure.

17. The battery thermal management method of claim 8, wherein a portion of the third structure extends through an aperture in the thermal exchange plate to contact the first structure.

* * * * *